3,023,200
DICYCLOPENTADIENE ALKYLATION POLYMERS

Martin E. Epstein, Ashbourne Hills, Del., and Nicholas C. Gangemi, West Chester, Pa., assignors to Pennsylvania Industrial Chemical Corporation, a corporation of Pennsylvania No Drawing. Filed Feb. 6, 1959, Ser. No. 791,530
3 Claims. (Cl. 260—93.1)

There have been many proposals for the polymerization of cyclopentadiene and dicyclopentadiene (DCPD). These have involved both homopolymerization as well as copolymerization with such substances as styrene, butadiene, and many other organic compounds. As far as we are aware, such attempts have failed to produce soluble polymers of satisfactory color stability and resistance to attack by oxygen, or they have resulted in objectionable amounts of gels and insoluble products. Thus ordinary vinyl polymerization of DCPD can give rise to soluble polymers in which only about half of the double bonds are consumed. The residual unsaturation accounts for the instability of such polymers. If the polymerization is carried out in such a way that more than half of the double bonds are consumed, cross linking results with the formation of gels and insoluble polymers.

A major object of the present invention is to provide a method of making alkylation polymers of cyclopentadiene and its polymers, such as DCPD, that is simple, readily practiced, results in production of minimal amounts of insoluble polymers or gels, and is productive of soluble polymers of satisfactory stability against color change and oxidation.

A further object is to provide soluble DCPD alkylation polymers of satisfactory stability against color change and oxidation.

The term "alkylation" as used herein has reference to the formation of a carbon-to-carbon bond between an aromatic nucleus and a DCPD nucleus.

We have found, and it is upon this that the invention is largely predicated, that DCPD can alkylate aromatic compounds in the presence of Friedel-Crafts catalysts to produce polymers in accordance with the objects of the invention. Designating DCPD by the letters DCPD and the aromatic nucleus by the letters "Aro," the resulting structure can be represented as:

Aro—DCPD—Aro

If the aromatic nuclei have further reactive positions, the polymers can take the general form:

Aro—DCPD—Aro—DCPD—Aro and so on, which can be represented by the unit

Aro(DCPD—Aro)$_n$ where $n$ is a whole number one or larger.

The term "saturated aromatic hydrocarbon" as used herein has reference to saturated aromatic hydrocarbons free from olefinic or vinyl unsaturation.

The objects of the invention are attained by conducting the alkylation reaction under conditions such that there is no accumulation of unreacted DCPD in the presence of the Friedel-Crafts catalyst whereby to produce only alkylated products, with avoidance of polymerization of DCPD itself, and thus to produce alkylated polymers in which the DCPD nuclei contain no double bonds and the end groups of which are aromatic nuclei with substantially no residual unsaturation that might cause cross linking or be susceptible to oxidation. The PCPD and aromatic compound are, of course, used in such amounts as to fully saturate the DCPD double bonds.

A convenient way to accomplish the purpose of the invention is to add the DCPD gradually to a mixture of a suitable aromatic compound, such as xylene, and a suitable Friedel-Crafts catalyst, such as aluminum chloride, the rate of DCPD addition being such that it is consumed as fast as it is added with alkylation of the aromatic compound. The resulting soluble polymer is satisfactorily stable, and there is no, or substantially no, insoluble polymer formed. If, on the other hand, the catalyst is added to a mixture of the aromatic hydrocarbon and the DCPD, all other conditions being the same, considerable amounts of insoluble polymer form and the soluble polymer is relatively unstable.

As evidencing the importance of adding the DCPD to a mixture of catalyst and aromatic compound at a rate such that the DCPD reacts as rapidly as it is added, reference may be made to the following example.

EXAMPLE 1

To a mixture of 400 gm. of 3° xylene and 5 gm. of AlCl$_3$ in a stirred flask was gradually added 100 gm. of DCPD of approximately 95% purity over a period of 15 minutes. The temperature was maintained at 30° to 35° C. during the addition by external cooling. The contents of the flask were stirred for an additional 75 minutes at 30° to 35° C., at the end of which time the polymerizate was quenched with 50 ml. of water at 40° to 45° C. The water was separated and the polymerizate was washed with 50 ml. of a 10% Na$_2$CO$_3$ solution. After the Na$_2$CO$_3$ solution was separated, the resin was isolated by steam distillation at a 250° C. pot temperature until the ratio of water to oil in the distillate was 20:1, followed by the distillation of a volume of water and oil equal to 40% of the weight of the initial total polymerizate charged to the distillation flask at 250° C. pot temperature.

In this way, 206.1 gm. of resin having a ball and ring softening point of 78.8° C. and a Gardner color of 11 was obtained. No insoluble or gelatinous polymer was observed. The resin had a molecular weight of 483 (cryoscopic in benzene), and an aniline point of minus 33° C. (calculated from a mixed aniline point using methylcyclohexane as the diluent). The bromine number (electrometric) of the resin was less than 1.0.

EXAMPLE 1–A

Another sample of resin was prepared in the same way, except that 10 gm. of AlCl$_3$ was used. The same addition time, additional reaction time, and temperatures were used. This resin was obtained in a 209.7 gm. yield and had a 73.3° C. ball and ring softening point, a 12½ Gardner color and a minus 30° C. calculated aniline point. This resin had a bromine number (electrometric) of 1.5 and a Wijs iodine number of 9 (at a 57% ICl excess). The rate of oxygen absorption of this resin in an oxygen atmosphere at 110° C. was found to be 0.9/ml./hr./2.0 gm. sample corrected to standard temperature and pressure.

It is clear from the foregoing examples that more than twice as much polymer formed as DCPD charged, the difference being accounted for by alkylation of the aromatic hydrocarbon used. The very low aniline point of the resins is consistent with the presence of aromatic structures, and this has been confirmed by infra-red spectra of the products which give absorption bands consistent with alkylation of the xylene by the DCPD.

As evidencing the importance of practicing the invention in the manner described above, reference may be made to the following example in which the catalyst was added to the mixture of DCPD and aromatic.

EXAMPLE 2

To a mixture of 400 gm. of 3° xylene and 100 gm. of DCPD of approximately 95% purity was added 5 gm. of AlCl$_3$ over a period of 15 minutes. The temperature was maintained at 30° to 35° C. during the addition by external cooling. Considerable amounts of granular material precipitated during the addition. The contents of the flask were stirred for an additional 75 minutes at 30° to 35° C. at the end of which time the polymerizate was quenched with 50 ml. of water at 40° to 45° C. The insoluble polymer was removed by filtration and washed with 100 gm. of 3° xylene. The weight of the dried insoluble polymer was about 50 gm. The combined polymerizate and xylene washings were washed with $Na_2CO_3$ solution, and the soluble resin isolated as in Example 1. The procedure yielded 75.5 gm. of soluble resin with a ball and ring softening point of 127.4° C., a Gardner color of 13 and a calculated aniline point of 18° C. The resin had a bromine number of 25.6 and an oxygen absorption rate of 11.4 ml./hr./2.0 gm. sample corrected to standard temperature and pressure at 110° C.

In contrast with the results of Examples 1 and 1–A, Example 2 resulted in a lower yield of soluble resin and necessitated the separation of a substantial proportion of insoluble polymer in order to recover the desired soluble portion. Moreover, the soluble polymer evidently is much more highly unsaturated and absorbs oxygen more than 10 times as rapidly as the polymer produced in accordance with the invention.

The low unsaturation of the Example 1 and 1–A polymers confers stability which is desirable in applications where oxygen absorption and color darkening are undesirable.

The reaction may be performed in other ways that consume the DCPD wholly, or substantially so, by alkylation with suppression of insoluble polymer formation and production of polymers of minimal unsaturation. Thus, DCPD, a suitable aromatic compound, and catalyst can be fed continuously to an agitated reaction vessel equipped with appropriate heating and/or cooling means, and product in the form of unquenched polymerizate continuously withdrawn. The polymerizate can then be quenched and washed continuously or batchwise in a conventional manner. In this way the DCPD is diluted by the polymerizate and is rapidly consumed in the alkylation reaction with prevention of build-up of unreacted material. As illustrative of this practice the following example is given.

EXAMPLE 3

A mixture of 80 parts by weight of 3° xylene and 20 parts by weight of approximately 95% DCPD was fed continuously at a rate of 1 liter/hour to a vessel equipped with an agitator, a thermometer, a temperature controller, and a cooling coil. The volume in the vessel was maintained at approximately 2 liters.

Catalysts ($AlCl_3$) was added to the vessel in portions at 15 minute intervals, in quantities sufficient to maintain an average of 2% catalyst level (by weight) based on the sum of the DCPD and xylene charged. Under these conditions, the mean contact time was approximately 2 hours. The polymerizate from this vessel was continuously fed to a soaker or second reaction vessel at a rate sufficient to maintain the 2 liter reactor volume in the first vessel.

The soaker was equipped with a thermometer, a stirrer, an electric heater, and a cooler. The volume in the soaker was also maintained at 2 liters, this level being controlled by the rate at which polymerizate was removed from the soaker. The mean contact time in the soaker was also 2 hours, and the mean contact time for the total reaction was 4 hours.

The temperature in the first vessel was maintained at 30° to 35° C. by external cooling, and the temperature in the second reactor at 30° to 35° C. by external heating.

After 11½ hours of continuous polymerization, a sample of polymerizate taken from the soaker exit line was quenched and washed, and the resin isolated by steam distillation as in Example 1. The quenched polymerizate yielded 42.1% resin of 80.5° C. ball and ring softening point and had a color of 2 (Coal Tar Scale). The calculated aniline point of the resin was minus 30° C. The yield of resin based on the DCPD charged was 210%. The resin had an oxygen absorption value of 1.3 ml./hr./2.0 gm. sample at 110° C., corrected to standard temperature and pressure.

This invention is not restricted by the method of quenching the polymerizate or the method of isolating the polymer from it. Anyone familiar with the art can derive alternative methods of quenching and washing the polymerizate, and of isolating the polymer. Thus, for example, polymerizates can be drowned and/or washed with caustic soda solutions, and the polymers isolated by vacuum distillation of the residual solvents or by precipitation from the solvents by the addition of a nonsolvent. In cases when the concentration of polymer is high, say greater than 45% of the polymerizate, suitable solvents such as heptane, naphtha, aromatics, and so on can be added to facilitate handling during quenching and washing. The solvent can be added before, during or after the quenching procedure. The judicious application of heat may also be useful in facilitating handling. The catalyst may, of course, also be removed by adsorption and other means well known to people experienced in the art of resinous polymer manufacture.

According to our experience, the DCPD should be relatively pure because substantial amounts of its homologs, such as methylcyclopentadiene dimer and codimers of cyclopentadiene and methylcyclopentadiene such as occur in crude DCPD streams from petrochemical operations interfere seriously. We have found from experience that the unsaturation, color stability and oxygen absorption values of the alkylated resins are generally poorer when such crude DCPD streams are used. This can be illustrated by the following example.

EXAMPLE 4

To clearly demonstrate the statement just made, a series of experiments were run utilizing mixtures of the reactive diolefins with commercial 3° xylene. The reactions were run essentially as outlined in Example 1, using 400 gm. of 3° xylene, 100 gm. of DCPD or its mixture with di(methylcyclopentadiene) and 10 gm. of $AlCl_3$. The same addition time, additional reaction time, and temperatures were used. DCPD varying from 67.2 to 98.8 weight percent purity, containing 31.1 to 0.5 weight percent of di(methylcyclopentadiene) was used.

The data obtained are given in the following Table I. The softening point was determined according to ASTM specification E–28–51T. The color was determined with a solution of 5 gm. of resin in 5 gm. of toluene read on Gardner standards according to "Physical and Chemical Examination of Paints, Etc." by Henry A. Gardner, 9th Ed., May 1939. Aniline points were calculated from a mixed aniline point similar to ASTM procedure D–611–51T except that methylcyclohexane was used as the diluent. The bromine numbers were electrometric according to ASTM D–1159–52T except that a solution of bromine in carbon tetrachloride was used. The oxygen uptake was determined by a modified procedure in which the oxygen absorption is measured manometrically: a 20 percent solution of resin in o-dichlorobenzene (2 gm. of resin) is tested at 110° C. and slopes of the graphic plot of volume of oxygen versus time are values given for an initial two hour period corrected to standard temperature and pressure. The thermal color stability, shown by the column "T.C.S." was determined on 2 gm. resin in 25 ml. cetane refluxed at atmospheric pressure in the presence of a stream of air for 30 minutes. The values represent the change in optical density×10 at 535 mu using the Leitz-Rouy electrophotometer.

The data of Table I clearly demonstrate why relatively pure DCPD is preferable in the practice of this invention. Thus, the unsaturation became progressively debased as the purity of the DCPD decreased as a result of the presence of increasing amounts of the methylcyclopentadiene dimer which fails to undergo the alkylation reaction under conditions favorable to the formation of DCPD alkylation polymers. The polymer yield based on the total diolefin charge shows a marked drop when the methyl isomer content is about 11 percent or greater. These data show that the presence of more than about 11 percent of the methylcyclopentadiene dimer seriously interferes with the alkylation polymerization reaction of the DCPD. Similarly, at and over about 11 percent of the methylcyclopentadiene dimer the unsaturation increases undesirably for many purposes, and the polymer becomes color unstable. However, even when the methylcyclopentadiene dimer concentration is as high as 30 percent, some alkylation of the DCPD does occur, and it is important that even at this high concentration no insoluble polymer was formed.

One factor that affects the yield and properties of the polymers produced in accordance with this invention is the ratio of DCPD to the aromatic material used. This may be exemplified by the following example, the data of which are given in Table II.

EXAMPLE 5

A series of alkylation-polymerizations were carried out in essentially the same manner as in Example 1, except that the relative amounts of DCPD, 3° xylene and AlCl$_3$ were varied. Two samples of DCPD of slightly different purity were used. The results and experimental conditions of these reactions are shown in Table II. In no case was the formation of insoluble polymer observed.

The data of Table II illustrate the wide range of properties obtainable by this reaction. It is clear from the data that increasing the amount of dicyclopentadiene relative to the xylene generally results in increasing softening points, molecular weights and aniline points. The advantages of being able to prepare products with such a wide range of properties merely by changing the relative quantities of aromatic, DCPD and catalyst are obvious to anyone experienced in the art of polymer manufacture. With this invention it is possible to prepare a product of a specific softening point, say 100° C., after a few simple experiments relating to the variables described.

Although the invention has been exemplified by xylene as the aromatic to be alkylated, DCPD alkylation polymers have been derived in accordance with the invention from such diverse aromatic materials as toluene, ethylbenzene, the three individual xylene isomers, cumene, p-cymene, anisole, and various phenols and substituted phenols, as well as hydrocarbon streams containing aromatic structures constituting overhead oils from Friedel-Crafts polymerization of cracked petroleum distillates, such streams representing boiling ranges of about 100° to 125° C., 125° to 150° C., 150° to 175° C., 175° to 200° C. and 200° to 300° C. Where such hydrocarbon streams contain substantial amounts of olefinic material it is desirable initially to treat them for a period of time with aluminum chloride or the like Friedel-Crafts catalyst before beginning the addition of the DCPD. Likewise, in the treatment of such hydrocarbon streams an amount of sludge may form that may be separated prior to drowning to give resin of lighter color although at some expense in yield. Where color is not important, the sludge need not be removed.

Another variable that influences the alkylation polymerization is temperature. This is not a critical factor from our experience for the reaction proceeds satisfactorily over the range of at least 10° to 75° C. for xylene, and 0° to 95° C. for toluene. The useable temperature range is undoubtedly wider but practical considerations

Table I

ALKYLATION POLYMERS OF 3° COMMERCIAL XYLENE WITH BLENDS OF DICYCLOPENTADIENE AND DI(METHYLCYCLOPENTADIENE)

| Composition of diolefin charge | | | Resin yields, weight percent based on total diolefin charge | Resin properties | | | | | | |
|---|---|---|---|---|---|---|---|---|---|---|
| Weight percent, dicyclo. | Weight percent, di(methylcyclo.) | Weight percent, others | | Ball and ring S.P. °C. | Gard. color | Calc. A.P., °C. | Bromine number | Oxygen uptake, ml./hr./ 2 g. sample | T.C.S. | Ultra violet stability |
| 98.8 | 0.5 | 0.7 | 215.4 | 72.9 | 10+ | −34 | 1.4 | 1.1 | 2.9 | Good. |
| 96.0 | 1.5 | 2.5 | 209.7 | 73.3 | 12½ | −30 | 1.5 | 0.9 | 3.3 | Do. |
| 91.2 | 6.4 | 2.4 | 206.7 | 70.5 | 14+ | −31 | 3.1 | 2.3 | 4.9 | Do. |
| 86.4 | 11.4 | 2.2 | 191.6 | 84.9 | 12½ | −14 | 5.8 | 3.8 | 12.1 | Do. |
| 81.6 | 16.3 | 2.1 | 148.1 | 97.1 | 17 | +3 | 9.6 | 4.8 | 18.2 | Fair. |
| 76.8 | 21.2 | 2.0 | 138.4 | 100.7 | 15+ | +19 | 15.2 | 9.2 | 23.1 | Poor. |
| 67.2 | 31.1 | 1.7 | 100.9 | 120.8 | 18 | +38 | 29.6 | 10.4 | 34.1 | Do. |

Table II

ALKYLATION-POLYMERIZATION OF 3° XYLENE WITH DICYCLOPENTADIENE USING VARIOUS RELATIVE AMOUNTS OF AROMATIC MATERIAL, DICYCLOPENTADIENE AND CATALYST. ALL REACTIONS AT 30–35° C.

| | b | d | e | f | h | i | j |
|---|---|---|---|---|---|---|---|
| Weight of dicyclopentadiene, g | 50.0 | 100.0 | 100.0 | 150.0 | 200.0 | 200.0 | 250.0 |
| Dicyclopentadiene purity, mole percent | 96 | 96 | 94 | 96 | 94 | 94 | 94 |
| Weight of 3° Xylene, g | 400.0 | 400.0 | 400.0 | 400.0 | 400.0 | 400.0 | 400.0 |
| Xylene: dicyclopentadiene ratio | 8:1 | 4:1 | 4:1 | 8:3 | 2:1 | 2:1 | 8:5 |
| Weight of AlCl$_3$, g | 5.0 | 3.0 | 10.0 | 5.0 | 15.0 | 30.0 | 37.5 |
| Wt. percent AlCl$_3$ on total charge | 1.11 | 0.60 | 2.00 | 0.91 | 2.50 | 5.00 | 5.77 |
| Dicyclopentadiene addition, time, minutes | 7.5 | 15 | 15 | 22.5 | 30 | 30 | 24 |
| Additional reaction time, minutes | 82.5 | 75 | 90 | 67.5 | 90 | 90 | 90 |
| Resin yield, g | 101.7 | 206.1 | 210.4 | 298.5 | 320.6 | 376.0 | 429.5 |
| Resin yield, weight, percent on total oil charged | 22.6 | 41.2 | 42.1 | 54.3 | 53.4 | 62.7 | 66.1 |
| Resin yield, weight, percent on dicyclopentadiene | 203.4 | 206.1 | 210.4 | 199.0 | 160.3 | 188.0 | 171.8 |
| Resin properties: | | | | | | | |
| S.P., °C. (ball and ring) | 48.3 | 78.8 | 87.7 | 108.1 | 118.6 | 130.8 | 144.2 |
| Color (Gardner) | 11 | 11 | 10½ | 10 | 10 | 10 | 11 |
| A.P., °C. (calculated) | −40 | −33 | −21 | −12 | 8 | 7 | 18 |
| Molecular weight (cryscopic) | 381 | 483 | | 553 | | 684 | | dictate a range of, say, 0° to 100° C. as the most desirable. Lower temperatures require excessive cooling capacity whereas temperatures above 100° C. result in high vapor pressures and darker colored resins. Within limits, varying the temperature can be used to vary the softening point, aniline point and color of the product. These data are shown in Table III.

Time of reaction may be applied also to vary the properties of the product as evidenced by the following example, the data from which appear in Table IV.

Table IV
THE EFFECT OF REACTION TIME ON THE DICYCLOPENTADIENE-ALKYLATION POLYMERIZATION

| | | | | | | | |
|---|---|---|---|---|---|---|---|
| Xylene: DCPD ratio | 4:1 | 4:1 | 4:1 | 4:1 | 2:1 | 2:1 | 2:1 |
| Addition time, mins | 15 | 15 | 15 | 15 | 30 | 30 | 30 |
| Additional reaction time, mins | 0 | 30 | 75 | 330 | 5 | 90 | 330 |
| AlCl$_3$, weight percent on total oil charged | 2.00 | 2.00 | 2.00 | 2.00 | 3.33 | 3.33 | 3.33 |
| Resin yield, weight percent on DCPD | 215.4 | 206.0 | 209.6 | 212.1 | 172.1 | 198.5 | 201.4 |
| Resin yield, weight percent on total oil charged | 43.1 | 41.2 | 41.9 | 42.4 | 34.4 | 39.7 | 40.3 |
| Resin properties: | | | | | | | |
| S. P. (ball and ring), °C | 88.7 | 83.3 | 73.3 | 60.9 | 111.9 | 119.0 | 111.6 |
| A. P. (calculated), °C | −20 | −24 | −30 | −40 | −2 | −2 | −8 |
| Bromine number (electrometric) | 1.5 | 1.8 | 1.5 | 1.8 | 5.5 | 2.5 | 2.2 |
| Color (Gardner) | 11 | 11½ | 12½ | 13½ | 11 | 12 | 11 |

While all aromatic compounds, or mixtures of such compounds, may not react under the conditions of the foregoing examples, it is believed that by simple experimentation with all reaction conditions and catalysts the alkylation reaction of this invention is of general applicability provided that reactive positions are available

Table III
THE EFFECT OF TEMPERATURE ON THE DICYCLOPENTADIENE-ALKYLATION POLYMERIZATION

| Aromatic material | Xylene | Xylene | Xylene | Xylene | Toluene | Toluene | Toluene | Toluene |
|---|---|---|---|---|---|---|---|---|
| Temp., °C | 10-15 | 30-35 | 50-55 | 70-75 | 0-5 | 30-35 | 60-65 | 90-95 |
| Weight percent AlCl$_3$ on total oil chgd | 1.0 | 1.0 | 1.0 | 1.0 | 4.0 | 4.0 | 4.0 | 4.0 |
| Addition time, minutes | 15 | 15 | 15 | 15 | 60 | 60 | 60 | 60 |
| Additional reaction time, minutes | 75 | 75 | 75 | 75 | 120 | 120 | 120 | 120 |
| Resin yield, weight percent on dicyclopentadiene | 203.5 | 211.5 | 214.2 | 209.4 | 178.6 | 186.6 | 173.9 | 142.1 |
| Resin yield weight percent on total oil charged | 40.7 | 42.3 | 42.8 | 41.9 | 35.7 | 37.3 | 34.8 | 28.4 |
| Resin properties: | | | | | | | | |
| S.P., °C | 92.1 | 79.2 | 61.7 | 53.2 | 110.3 | 72.3 | 38.7 | 48.4 |
| Color, Gardner | 9½ | 9½ | 12½ | 15 | | | | |
| Color, coal tar | | | | | 2 | 3 | 8 | 12 |
| A.P., calc'd, °C | −21 | −30 | −39 | −40 | −11 | −32 | −40 | −40 |

EXAMPLE 6

A series of polymerizations were run in a manner similar to that of Example 1, using 3° xylene and approximately 95% DCPD in 4:1 and 2:1 ratios. An addition time of 15 minutes at a 2.0% AlCl$_3$ catalyst level was used at the 4:1 ratio, and an addition time of 30 minutes at a 3.33% AlCl$_3$ catalyst level was used at the 2:1 ratio. All reactions were conducted at 30° to 35° C. Polymerizates were quenched and washed using standard techniques, and the polymers were isolated by steam distillation. The reaction conditions and results are summarized in Table IV.

The results of Table IV show clearly that the reaction occurs successfully at all the reaction times investigated, and as far as is known there is nothing critical in this factor. At the 4:1 ratio the resin yield was essentially the same after no additional reaction time and after 330 minutes additional time, and the low degree of unsaturation remained essentially constant. With increased reaction time at that ratio there is a marked and progressive decrease in softening and aniline points. This is believed to be due to reversibility of the reaction in the presence of the catalyst. Thus, it is believed that at the 4:1 ratio and under the reaction conditions the initial product was of higher molecular weight than that which would be formed at equilibrium. Thus polymer of the composition Aro—DCPD—Aro—DCPD—Aro could react with further aromatic in the presence of the catalyst as follows:

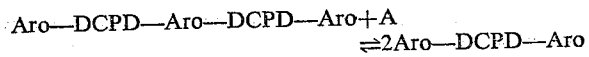

Aro—DCPD—Aro—DCPD—Aro+A
⇌2Aro—DCPD—Aro

The ultimate molecular weight and hence the properties dependent on it, would then be a function of the values of the equilibrium constants involved and the concentration of DCPD and aromatic. At the 2:1 ratio this phenomenon is not so apparent. This may be due to the initial reaction product at this ratio being closer to the equilibrium product than in the foregoing case.

in the aromatic compound. Although aluminum chloride is the preferred catalyst, aluminum bromide is also operative, and boron trifluoride acts satisfactorily with phenol and cresols. Some known Friedel-Crafts catalysts may be relatively weak agents with some aromatics but may be satisfactory with others.

Although the invention has been described with particular reference to DCPD, we have found that the method is equally applicable to alkylation by higher polymers of cyclopentadiene, such as the trimer, or mixtures of DCPD and the trimer or higher polymers. In such instances the properties of the alkylation polymer with an aromatic compound may be somewhat different than those of alkylation polymers of substantially pure DCPD but this, again, is evidence of the versatility of the invention in providing soluble and color stable polymers.

The products of this invention have utility in a variety of fields where thermoplastic resins are now used, for instance as binders in asphalt tile manufacture. The stability of the products toward color change and oxidation is better than that of most of the petroleum derived hydrocarbon resins now available, which is a particular advantage in the thermoplastic resin field.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. A thermoplastic composition consisting essentially of polymer of recurring units of aromatic nuclei alkylated by dicyclopentadiene and represented by the unit

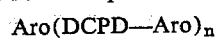

Aro(DCPD—Aro)$_n$ where Aro represents the aromatic nucleus, DCPD represents the dicyclopentadiene nucleus, and $n$ is a whole number greater than one, and in which unit the DCPD nuclei contain substantially no residual unsaturation, said polymer being stable against color change under oxidizing conditions.

2. A composition according to claim 1, said aromatic nuclei being monocyclic.

3. A composition according to claim 1, said polymer being of about 38° to about 144° C. softening point.

References Cited in the file of this patent

UNITED STATES PATENTS

| | | |
|---|---|---|
| 2,314,904 | Soday | Mar. 30, 1943 |
| 2,371,499 | Britton et al. | Mar. 13, 1945 |
| 2,603,655 | Strain | July 15, 1952 |
| 2,734,892 | Carter | Feb. 14, 1956 |